Patented Nov. 4, 1947

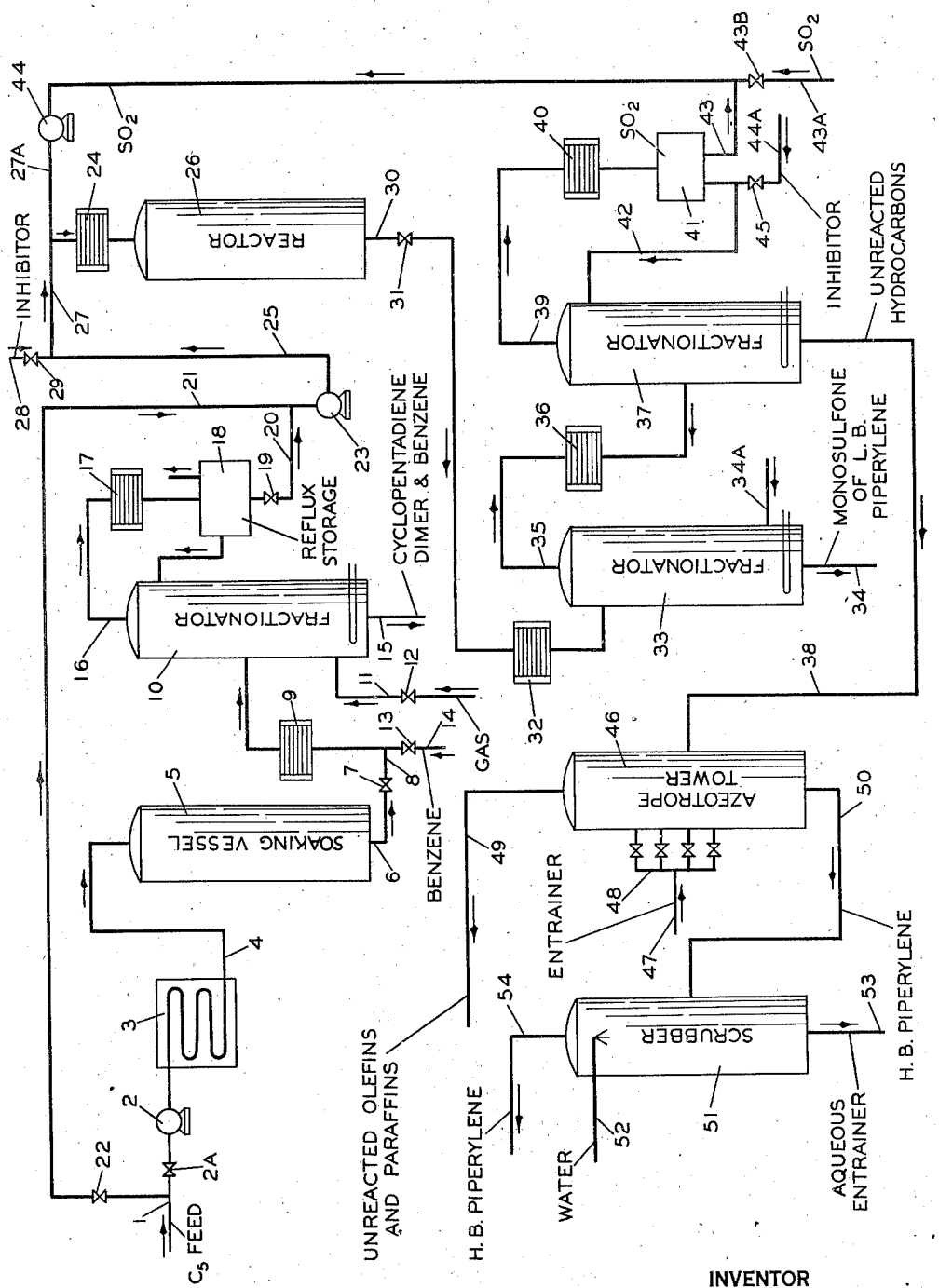

2,430,395

UNITED STATES PATENT OFFICE 2,430,395

PROCESS OF SEPARATING GEOMETRIC ISOMERS OF PIPERYLENE FROM EACH OTHER

Frederick E. Frey, Bartlesville, Okla., assignor to Phillips Petroleum Company, a corporation of Delaware Application February 13, 1942, Serial No. 430,828

1 Claim. (Cl. 260—681.5)

This invention pertains to the recovery of diolefin hydrocarbons, and more particularly to the recovery and concentration of the isomeric piperylenes. Still more particularly it relates to the concentration of isomeric piperylene for the manufacture of synthetic rubber.

Piperylene exists in two isomeric forms having the following approximate physical properties:

|  | B. P., °C. | $N_D^{20°C.}$ | Sp. gr. $\frac{20°C.}{20°C.}$ |
|---|---|---|---|
| Low-boiling isomer | 42.1 | 1.4297 | 0.6771 |
| High-boiling isomer | 44.1 | 1.4359 | 0.6915 |

Geometrical isomerism of this sort not only results in the pronounced differences in the physical properties noted above; but also results in differences in chemical behavior that in some instances are even more pronounced. The low-boiling isomer is much more reactive than the high-boiling isomer. Thus, the low-boiling isomer reacts rapidly to form an addition product with maleic anhydride, while the high-boiling isomer reacts so slowly that this reaction may be utilized as an analytical method for determining the relative amounts of the two isomers present. Similarly, at 60° C. the low-boiling isomer reacts 10 times as fast as the high-boiling isomer with sulfur dioxide to form the monosulfone. In other cases also, the two isomers react differently. The high-boiling isomer is of particular value in the manufacture of synthetic rubber.

It is an object of my invention to prepare piperylene concentrates containing substantial amounts of the high-boiling isomer.

It is a further object to prepare piperylene concentrates that are substantially free of the high-boiling isomer.

Still another object is to provide a process for the separation and recovery of concentrates of the high-boiling and low-boiling piperylene isomers.

Other objects will appear from the following description.

The essential step of my invention is to react a hydrocarbon fraction containing the isomeric piperylenes, which may be derived from any source, with sulfur dioxide for a period of time too short to allow the reaction with the low-boiling isomer to reach equilibrium. By limiting the reaction to something less than equilibrium, maximum advantage is taken of the difference in the reaction rate of the low- and high-boiling isomers. The unreacted products, which are richer in the high-boiling piperylene isomer than the charging stock used, may then be freed of sulfone and subjected to a second reaction step, if desired, the piperylene containing enhanced amounts of the high-boiling isomer recovered from the products in any suitable manner. The monosulfones may be recovered and decomposed by heating to from about 80 to 300° C. Piperylene from this source is nearly pure low-boiling isomer.

As stated above, under a given set of conditions, the reaction of piperylene and sulfur dioxide does not go to completion, but approaches an equilibrium value. The equilibrium varies with the concentration of reactants employed, and with the temperature. As equilibrium is approached for the reaction of sulfur dioxide with the low-boiling isomer, the reaction time required becomes large, and this permits excessive amounts of the high-boiling isomer to react. The high-boiling isomer is not regenerated upon decomposition of the monosulfone, and since the equilibrium is the result of balanced sulfone forming and decompositon reactions, very long times may result in the conversion of most of the high-boiling isomer into the low-boiling isomer.

I prefer to conduct the reaction under conditions such that at least about one-half and not more than about nine-tenths as much of the low-boiling isomer is reacted as would react at equilibrium. If two or more reaction steps are employed, the amount reacted in each step may be in the range of about 50 to 90 per cent of equilibrium. Under given conditions of piperylene concentration, sulfur-dioxide concentration and temperature, reaction time in minutes may be estimated approximately from the following relation:

$$t = \frac{2.303}{k_2 B} \log_{10} \frac{(A-B)(A+B-2nC)}{(A+B)(A-B-2nC)}$$

where $A = P + S + K$, $B = \sqrt{(P+S+K)^2 - 4PS}$

P = concentration of low-boiling piperylene in moles per liter
S = concentration of sulfur dioxide in moles per liter
K = $k_1/k_2$
$k_1$ = velocity constant for the decomposition of the monosulfone
$k_2$ = velocity constant for the formation of the monosulfone $t$ = time in minutes
$n$ = a constant having values in the range of 0.5 to 0.9
$C$ = low-boiling piperylene reacted at equilibrium.

$C$ may be estimated from the following equation:

$$C = \sqrt{\left(\frac{S-P+K}{2}\right)^2 + KP} - \frac{S-P+K}{2}$$

Values for the reaction velocity constants are listed in the following table.

| Temperature, °C. | Monosulfone Decomposition ($k_1$) | Sulfone Formation ($k_2$) | |
|---|---|---|---|
| | | L. B. Piperylene | H. B. Piperlyene |
| 40 | $7.5 \times 10^{-5}$ | $1.5 \times 10^{-4}$ | $7.5 \times 10^{-6}$ |
| 60 | $2.9 \times 10^{-4}$ | $3.5 \times 10^{-4}$ | $2.8 \times 10^{-5}$ |
| 80 | $9.3 \times 10^{-4}$ | $7.2 \times 10^{-4}$ | $8.7 \times 10^{-5}$ |
| 100 | $2.5 \times 10^{-3}$ | $1.4 \times 10^{-3}$ | $2.5 \times 10^{-4}$ |
| 120 | $6.5 \times 10^{-3}$ | $2.4 \times 10^{-3}$ | $6.4 \times 10^{-4}$ |
| 140 | $1.5 \times 10^{-2}$ | $4.0 \times 10^{-3}$ | $1.5 \times 10^{-3}$ |

My invention may be described more fully by reference to the drawing which is a diagrammatic sketch of apparatus for carrying out one form of my process in which the charging stock may be a complex mixture of hydrocarbons containing five carbon atoms per molecule such as, for example, is derived from the pyrolysis of hydrocarbons at low pressure and high temperature, or may be of a somewhat simpler constitution, as a piperylene fraction from the catalytic dehydrogenation of n-pentane or either n-pentene. It is understood that other arrangements are possible to fit specific feed stock compositions and may be used without departing from the spirit of my invention.

Referring to the drawing, a mixture of C₅ hydrocarbons including both piperylenes and derived from any source, as, for example, a C₅ fraction separated by fractional distillation or by other means from the products of a low pressure, high temperature cracking operation, or a piperylene-containing fraction separated by fractional distillation or by other means from the products of the catalytic dehydrogenation of n-pentane or either n-pentene, enters the system through pipe 1. The C₅ fraction derived from cracking may contain, in addition to the low- and high-boiling isomers of piperylene, isoprene, cyclopentadiene, cyclopentene and other simple olefins and paraffins. That from dehydrogenation of n-pentane may consist largely of the piperylenes, simple i. e., acyclic, olefins and n-pentane. Cyclopentene may be absent from such mixtures.

If cyclopentadiene is present it may be removed by polymerizing it and separating the high-boiling dimer thereby formed. This polymerization may preferably be done as a separate step, but may also be accomplished in the sulfone forming step. The polymerization rate of cyclopentadiene, however, is slow compared with the sulfone forming reaction rate, and usually the cyclopentadiene removal will be incomplete in the latter case, and it would be necessary to separate some cyclopentadiene from the recovered piperylene.

Assuming cyclopentadiene to be present, the stream flows from pump 2, where its pressure is raised to 150 to 400 pounds per square inch (p. s. i.), to heater 3 where the temperature is raised to 75° to 175° C. It then passes through pipe 4 to soaking vessel 5, which may be equipped with baffles, packing or other devices to prevent convection. Vessel 5 is of such size as to allow a soaking time long enough to complete the dimerization of cyclopentadiene. The times may range from about 4 hours to about 30 hours, depending upon the temperature, and the concentration of cyclopentadiene present. The products pass from the bottom of 5 through pipe 6 and valve 7 where pressure is reduced, through pipe 8 and heat exchanger 9 to column 10 where the dimer is separated by fractional distillation.

In order to avoid decomposing the dimer, it is necessary to keep the temperature of the kettle low in this fractionation. This may be accomplished by conducting the distillation at subatmospheric pressure, or by adding a stripping gas such as propane through pipe 11 and valve 12, or by adding a substance boiling somewhat higher than the C₅ hydrocarbons, as, for example, hexane or benzene through pipe 14 and valve 13. The dimer and hexane or benzene and the like are removed from 10 through pipe 15. The hexane or benzene, etc., may be recovered and recycled. The C₅ fraction, substantially free of cyclopentadiene passes through pipe 16 and cooler 17 to reflux storage tank 18. A portion of the condensate returns as reflux to 10 through pipe 21a. The remaining condensate passes through valve 19 and pipe 20 to pipe 21.

When the charge stock initially is free of cyclopentadiene, it passes directly from pipe 1 to pipe 21 through valve 22.

The cyclopentadiene-free stream now passes to pump 23 where its pressure is raised sufficiently so that dense phase conditions are maintained in reactor 26. Pressures may be in the range of 100 to 1000 p. s. i. From pump 23 the stream flows to heat exchanger 24 where the temperature is adjusted in range of from about 20° to about 150° C. The stream passes through pipe 25 to pipe 27 where it is mixed with sulfur dioxide, supplied via line 27a, then through exchanger 24 and into reactor 26. Reactor 26 may be equipped with baffles, packing or other devices to prevent convection. Its size is adjusted to provide reaction times sufficient to effect from about 50 to about 90 per cent of equilibrium reaction of low boiling piperylene as previously discussed. Inhibitors such as pyrogallol, phenyl-beta-naphthylamine, cresols and the like may be added through pipe 28 and valve 29 to prevent polysulfone formation when the reaction temperature maintained in 26 is below about 100° C., if desired.

From reactor 26 the products pass through pipe 30, valve 31, heat exchanger 32 to fractionating column 33 where the monosulfone is separated leaving the system via line 34. It is necessary to conduct this distillation at temperatures low enough to avoid decomposing the sulfone. This may be accomplished by operating the column at low pressure; or a stripping gas, such as sulfur dioxide, may be introduced through pipe 34a. Unreacted C₅ hydrocarbons and sulfur dioxide pass through pipe 35, cooler 36 to tower 37 where C₅ hydrocarbons are separated from sulfur dioxide. While I have shown a fractionation tower for this step, other methods, such as absorption in a high-boiling oil, e. g., mineral seal oil, or gas oil may be used to effect this separation. Sulfur dioxide, together with a small amount of unreacted C₅ hydrocarbons, pass through pipe 39, cooler 40 to tank 41. Reflux is returned to 37 through pipe 42. In some cases, it may be desirable to add inhibitors such as pyrogallic acid, phenyl-beta-naphthylamine, or the like, through pipe 44a and valve 45 and thence to the top of column 37 to prevent polysulfone formation.

Condensate SO₂ from tank 41 passes through pipe 43, pump 44 and pipe 27a to the sulfone formation step. Make-up sulfur dioxide may be added through pipe 43a and valve 43b. Unreacted C₅ hydrocarbons pass through pipe 38 to azeotrope tower 46. Entrainer, such as propionaldehyde, propylene oxide, methyl formate and the like, enters through pipe 47 and manifold 48. Simple olefins, including cyclopentene, and paraffins, such as iso- and n-pentane, pass overhead through pipe 49 to a system not shown for recovering entrainer. It is understood that 46 is equipped with the usual overhead coolers and reflux vessels, pumps, and the like. The kettle product containing more or less entrainer passes through pipe 50 to scrubber 51, where entrainer is removed with a suitable solvent, as for example, water introduced through pipe 52. Solvent and entrainer are removed through pipe 53. The piperylene fraction, which is now considerably enriched in the high-boiling isomer, passes through pipe 54 to storage.

Cylclopentene forms a constant boiling mixture with the piperylenes, making it impossible to separate these substances by simple fractional distillation. For this reason, I have shown an azeotropic distillation step in tower 46 to separate the piperylenes from simple olefins including cyclopentene. If the charging stock to the process does not contain cyclopentene, fractional distillation without entrainers may be used in place of the azeotropic distillation step shown in the diagram. Scrubbing vessel 51 will not be required in this case.

Sulfone removed from fractionator 33 through pipe 34 may be decomposed in a system not shown in the figure by heating to temperatures in the range of 80° to 250° C. The sulfur dioxide and piperylene thus formed may be separated by fractionation or oil absorption and the piperylene recovered. In this case the product is substantially pure low-boiling piperylene. It is to be understood, however, that I am not the inventor or discoverer of the fact that decomposition of the sulfone of either low-boiling or high-boiling piperylene gives essentially pure low-boiling piperylene, since that subject matter is the invention of another. Accordingly the phenomenon of conversion of the reacting portion of high-boiling piperylene to low-boiling piperylene in this way when practicing my invention does not per se constitute any part of my invention. The sulfur dioxide may be returned to the sulfone formation step. If the charging stock to the process contained isoprene, this will also be recovered with the piperylene from the sulfone decomposition. The two diolefins may be separately recovered, if desired, by fractional distillation of the mixture resulting from the sulfone decomposition.

In the above process, I have shown one sulfone forming and separating step. In some cases increased concentration of the high-boiling isomer may be obtained by the use of two or more sulfone forming steps with intermediate sulfone separation, either by cooling and decantation of the sulfone phase, or by distillation as shown in the figure. For example the piperylene enriched in high-boiling piperylene, leaving via line 54 might be treated by substantially the process of this invention to further increase the concentration of high-boiling piperylene. In a multi-step process, the concentration of sulfur dioxide and the temperature may be adjusted separately for each step.

The following examples are cited for purposes of illustration only.

Example I

Fifty-one grams of a C₅ fraction containing 69 per cent piperylene, of which 20 per cent was the high-boiling isomer, and 70 grams of sulfur dioxide were placed in a steel container and held at room temperature for 23 hours. The vessel was then opened and unreacted C₅ separated from sulfur dioxide. The C₅ recovered contained 62 per cent piperylene, of which 41 per cent was the high-boiling isomer.

Example II

Fifty-one grams of a C₅ fraction containing 69 per cent piperylene, of which 20 per cent was the high-boiling isomer and 151 grams of sulfur dioxide were placed in a steel container and kept at 40° C. for 18 hours, followed by 48 hours at 0° C. The C₅ recovered upon opening the container was 62 per cent piperylene, of which 50 per cent was the high-boiling isomer.

Example III

A piperylene concentrate containing high-boiling and low-boiling piperylene in the ratio of 1 to 3 was placed in a steel container together with sulfur dioxide and 0.1 per cent by weight of pyrogallic acid in such amount that the container was about ¾ full. The vessel was warmed to 40° C. and maintained at this temperature for 6 hours. The initial concentration of reactants in moles per liter at 40° C. was low-boiling piperylene, 1.64; high-boiling piperylene, 0.56; and sulfur dioxide, 13.0. At the end of 6 hours, the container was opened and the products recovered. The unreacted C₅ fraction contained high- and low-boiling piperylene in the ratio of 39 to 61. The recovery of high-boiling piperylene was 96.5 per cent. Upon decomposition of the sulfone low-boiling piperylene, amounting to about 51 per cent of that originally present, was recovered.

Example IV

A second portion of the same charge used in Example III was reacted at 40° C. for 14½ hours. The products were separately recovered, and it was found that the unreacted C₅ fraction contained high- and low-boiling piperylene in the ration of 57.5 to 42.5. The recovery of high-boiling piperylene was 92 per cent. Upon decomposition of the sulfone, low-boiling piperylene amounting to about 85 per cent of that originally present was recovered.

Example V

A piperylene concentrate and sulfur dioxide were charged to a steel bomb in such amounts that the concentration of reactants in moles per liter at 100° C. was: high-boiling piperylene 0.45; low-boiling piperylene 1.38; sulfur dioxide 10.70. The vessel was then heated to 100° C. and allowed to remain at this temperature for 43 minutes. Upon recovery of the products, it was found that 42 per cent of the low-boiling and 11 per cent of the high-boiling piperylene had reacted to form the monosulfone. The unreacted C₅ fraction contained high- and low-boiling piperylenes in the ratio of 34 to 66.

Example VI

In an identical experiment to Example V, the vessel was heated for 101 minutes at 100° C. It was found that 68 per cent of the low-boiling and 19 per cent of the high-boiling piperylenes had reacted to form the sulfone. The unreacted C₅ fraction contained high- and low-boiling piperylenes in the ratio of 45 to 55.

Example VII

A piperylene concentrate and sulfur dioxide were charged to a steel vessel in such amounts that the concentration of reactants in moles per liter at 130° C. was: low-boiling piperylene 1.22; high-boiling piperylene 0.40; sulfur dioxide 9.50. The vessel was heated to 130° C. for 43 minutes. It was found that 58 per cent of the low-boiling and 29 per cent of the high-boiling piperylenes had reacted to form the monosulfone. The unreacted C₅ fraction contained high- and low-boiling piperylene in the ratio of 36 to 64.

Example VIII

The unreacted C₅ and sulfur dioxide recovered from Example IV were placed in a steel container together with 0.1 per cent by weight of phenyl-beta-naphthylamine and heated to 40° C. for a period of 3 hours. It was found that 49 per cent of the low-boiling and 3 per cent of the high-boiling piperylenes had reacted to form the monosulfone. The unreacted C₅ fraction contained high- and low-boiling piperylenes in the ratio of 72 to 28

Example IX

A piperylene concentrate and sulfur dioxide were charged to a steel vessel in such amounts that the concentration of reactants in moles per liter at 100° C. was: low-boiling piperylene 2.3; high-boiling piperylene 0.75; and sulfur dioxide 6.15. The container was heated to 100° C. for 2¼ hours. It was found that 57 per cent of low boiling and 23 per cent of the high-boiling piperylenes had reacted to form the monosulfone. The unreacted C₅ fraction contained high- and low-boiling piperylenes in the ratio of 46 to 54.

Example X

A piperylene concentrate and sulfur dioxide were charged to a steel container in such amounts that the concentration of reactants in moles per liter at 100° C. was: low-boiling piperylene 0.55; high-boiling 0.18; sulfur dioxide 14.6. The vessel was heated to 100° C. for 70 minutes. It was found that 71 per cent of the low-boiling and 26 per cent of the high-boiling piperylene had reacted. The unreacted C₅ fraction contained high- and low-boiling piperylene in the ratio of 45 to 55.

It will be understood that this description is illustrative merely and that the invention is to be taken as limited only by the terms of the appended claim.

I claim:

The process of resolving a mixture comprising high-boiling piperylene and low-boiling piperylene which comprises reacting said mixture with sulfur dioxide in a first reaction step, terminating the reaction after at least 50 per cent but not more than 90 per cent of the equilibrium amount of said low-boiling piperylene has reacted to form monosulfone, thereby converting low-boiling piperylene selectively to the monosulfone preferentially with respect to the high-boiling piperylene, separating the monosulfone formed from the unreacted piperylenes which are enriched with respect to high-boiling piperylene but contain a substantial proportion of low-boiling piperylene, reacting said mixture with sulfur dioxide in a second reaction step separate from the first, terminating the second reaction after at least 50 per cent but not more than 90 per cent of the equilibrium amount of the low-boiling piperylene content has reacted to form monosulfone, thereby converting low-boiling piperylene selectively to the monosulfone preferentially with respect to the high-boiling piperylene content, and separating the monosulfone formed from the unreacted piperylene which is still further enriched with respect to high-boiling piperylene.

FREDERICK E. FREY.

REFERENCES CITED

The following references are of record in the file of this patent:

UNITED STATES PATENTS

| Number | Name | Date |
|---|---|---|
| 2,386,375 | Welling (A) | Oct. 9, 1945 |
| 2,376,104 | Welling (B) | May 15, 1945 |
| 2,372,941 | Evans et al. | Apr. 3, 1945 |
| 2,361,493 | Patterson | Oct. 31, 1944 |
| 2,408,947 | Nutting et al. | Oct. 8, 1946 |
| 2,271,092 | Perkins et al. | Jan. 27, 1942 |
| 2,403,054 | Craig (A) | July 2, 1946 |
| 2,326,440 | Craig (B) | Aug. 10, 1943 |